UNITED STATES PATENT OFFICE 2,502,115

PROCESS OF PARTLY DEHYDRATING MEAT

Siegfried Zimmermann, Seekirchen, near Salzburg, Austria

No Drawing. Application February 11, 1948, Serial No. 7,725. In Germany February 21, 1944

4 Claims. (Cl. 99—208)

The process according to the invention relates to the preparation of dehydrated preserved meat particularly from raw meat.

The preparation of dehydrated preserved meat is known to be particularly difficult because the meat which has been dehydrated by heating is deficient especially as to its reswelling capacity, which is of special importance for the value of the preserved meat as regards taste and usefulness. If the dehydration is combined, as was suggested earlier, with salting in such a manner that the fat-free meat is strewed over with 2 to 3 per cent salt, predried at 50° to 60° C., and finally dehydrated completely at 100° C., a dehydrated product is obtained which can be swelled only with difficulty, and which has to be ground in order to give an edible meat meal. Such dehydrated meat meal does not meet the present-day requirements for a dehydrated preserved meat, neither as regards edibility nor taste. In another process, which has been described, for the preservation of fresh raw meat, the raw meat is strewed over with dry salt first and then subjected to limited dehydration in a stream of air at a temperature below the coagulation temperature of protein, which dehydration must not exceed a loss of weight of 30 per cent. But that method does not succeed either in obtaining a dried meat which reswells completely and quickly nor does it fully preserve the flavor. The durability (keeping quality at room temperature) of the food obtained that way is not satisfactory either.

Dehydrated meat shows a quality substantially superior to the usual dehydrated preserved meat if the dehydration has been effected (in accordance with a prior proposal of mine) in a vacuum, in presence of edible fats and edible oils, by heating the meat above the boiling point of water for the degree of vacuum used, so that the intercellular hollow spaces become filled up with fat or oil as the dehydration proceeds. In order to obtain durable dehydrated preserved meat in that way the necessity had to be faced to carry the dehydration to a low water content to make the product fit for long storage without canning. Though the reswelling capacity of a dehydrated preserved meat produced from raw meat in that manner is very good, there is yet some difference in the taste of the reswelled dehydrated meat as compared with fresh meat. I have now found that the reswelling capacity of dehydrated preserved meat obtained by that dehydration process may be improved and a product obtained which when reswelled is equal to fresh meat also as regards taste, if the dehydration process by careful heating in a vacuum in presence of edible oils and fats is applied to raw meat, which has been slightly salted before the dehydration, and if the dehydration process is discontinued at a stage in which the dehydrated meat still possesses a water content favorable for its re-swelling capacity. According to a preferred mode of application the dehydration is not carried below a residual water content of 20 to 30 per cent and so much common salt is suitably added to the raw meat that the salt content in the finished product, calculated on the residual water content amounts to 22 to 23 per cent, approximately. The percentage of salt, calculated on the weight of the raw meat, depends on the fat and water contents of the initial product.

The essential advantage of the process according to the invention consists in the fact that the comparatively higher water content of the dehydrated meat ensures that the preserved meat reswells much more quickly than a product dehydrated to a water content of less than 13 per cent as was usual in connection with my prior process. Dehydrated meat obtained according to the invention is capable, moreover, of absorbing that amount of water as approximately corresponds to the original water content of the raw meat without boiling, for instance, by simple stewing. When the meat is boiled the absorption of water occurs more quickly and more evenly than with dehydrated meat of less than 13 per cent water content. In spite of the comparatively higher water content the product obtained according to the invention is permanently durable, which fact is to be ascribed to the salt concentration in the residual water. It is remarkable, in that connection, that no pickling occurs in spite of the high salt content of the dehydrated meat so that the taste of the reswelled preserved meat is very different from that of pickled meat. That remarkable result may be explained by the fact that the concentration of salt, as long as it is in contact with the raw meat of full water content, is too weak to effect pickling while as the dehydration proceeds the filling up of the intercellular spaces with fatty substances and the low water content prevent a diffusion, which is essential for pickling.

The process according to the invention may be combined with special modes of carrying out the described dehydration process. It is for instance suitable, in particular, to cool or refrigerate the raw meat before or after salting and to feed it in a cooled-down condition into the oil or fat, which has been heated up to the coagulation temperature of the meat protein. That practice on the one hand, by coagulation of the surface layers of the meat, prevents an excessive leaching out of flavoring and nutritive substances from the food and, on the other hand, contributes to the prevention of pickling. In that manner a product is obtained which after cooking tastes only slightly of salt and may be prepared for the table in just the same way as fresh meat.

The process according to the invention may be carried out for instance as follows:

100 kg. of lean beef are carved and frozen to a temperature of minus 7° C. The frozen meat is cut to pieces of desired thickness, for instance, of 1 cm. These pieces are now evenly strewed over with 1.7 kg. of common salt, which is either rubbed or rolled into the meat. The pieces of meat, which are still cold, are then fed into the fatty liquid, which has been heated up to a temperature of 84° C., are subjected to a vacuum and dehydrated by the supply of heat. When the dehydration has reached a stage at which the residual water content of the raw meat amounts to slightly above 20 per cent, the dehydration is discontinued, the meat removed from the oil and finished in the usual manner.

What I claim is:

1. In a process for obtaining partly dehydrated preserved meat, the steps of salting meat and dehydrating the salted meat in the presence of an edible fatty substance in a vacuum at temperatures above the boiling point of water for the particular degree of vacuum employed, and interrupting the treatment when the water content of the meat is about 20 to 30%.

2. In a process for obtaining dehydrated preserved meat, the steps of salting meat and partly evaporating the water content of the salted meat in a vacuum in the presence of an edible fatty substance and discontinuing the dehydration process at a stage when the meat still contains more than 13% but below 30% of water.

3. In a process for obtaining partly dehydrated preserved meat, the steps of salting meat and partly evaporating the water content of the salted meat, in the presence of an edible fatty substance, in a vacuum, until the water content of the meat has been reduced to 20 to 30%.

4. In a process for obtaining a partly dehydrated preserved meat, readily swellable in water, the steps of applying to the meat such quantity of salt that the salt content of the finished product, after sufficient dehydration to preserve same, amounts to 22 to 23%, calculated on the residual water content of the meat, and then partially dehydrating the salted meat in the presence of an edible fatty substance, in a vacuum, at a temperature above the boiling point of water under the existing vacuum, and stopping the evaporation when the meat contains at least 13% but not over 30% of water.

SIEGFRIED ZIMMERMANN.

REFERENCES CITED

The following references are of record in the file of this patent:

UNITED STATES PATENTS

| Number | Name | Date |
| --- | --- | --- |
| 2,086,072 | Fauth et al. | July 6, 1937 |
| 2,346,232 | Piret et al. | Apr. 11, 1944 |